United States Patent Office 2,794,035
Patented May 28, 1957

2,794,035

PROCESS OF PRODUCING ERGOSTEROL AND CEREBRIN

Otto Hummel, Mannheim, Germany, assignor to Zellstofffabrik Waldhof, Mannheim-Waldhof, Germany No Drawing. Application December 13, 1952, Serial No. 325,901

Claims priority, application Germany December 17, 1951

12 Claims. (Cl. 260—397.25)

The present invention relates to a process of producing ergosterol and cerebrin and more particularly to a process of obtaining ergosterol and cerebrin from lipid-containing raw materials containing the same, i. e. yeast.

Ergosterol has been obtained from yeast by the treatment of the yeast with alcoholic caustic potash. This process however is very cumbersome and expensive. According to this process the entire raw material, all the yeast, is hydrolyzed so that there is no possibility of further utilization of the yeast residue. Furthermore, the processes by which the ergosterol is extracted by means of solvents from the saponified starting materials containing watery solvents, are unsatisfactory.

Other disadvantages of the prior processes are that they required considerable apparatus expenses for the saponification and extraction of the large amount of yeast, there was a great loss of solvent thereby increasing the expense of the process and large amounts of alkali were necessary for the saponification of the entire raw material.

It is therefore an object of the present invention to provide a process of extracting ergosterol and cerebrin from lipid-containing raw materials such as yeast whereby lesser amounts of solvent and alkali are necessary and whereby no special apparatus is required.

It is a further object of the present invention to provide a process of obtaining ergosterol and cerebrin from raw materials containing the same and also containing lipids i. e. yeast, whereby the ergosterol and cerebrin are easily separated in filterable form from the solution containing the same by merely cooling the solution to room temperature.

It is another object of the present invention to provide a process of separating the precipitated ergosterol from the precipitated cerebrin while freeing the substances from any impurities.

It is still another object of the present invention to provide a process of obtaining ergosterol and cerebrin from lipid-containing raw materials whereby the raw materials are not destroyed and may be utilized if desired for other purposes.

With the above objects in view the present invention mainly comprises in a process of obtaining ergosterol and cerebrin from lipid-containing raw materials containing the same, such as yeast, the steps of extracting the ergosterol and cerebrin along with at least a portion of the lipids from the raw materials by means of at least one solvent therefor so as to form an extract thereof, treating the thus formed extract in a boiling aqueous-alcoholic solution of the extracted ergosterol, cerebrin and lipids with alkali so as to saponify the lipids, thereby forming in the boiling aqueous-alcoholic solution fatty acid salts, cooling the aqueous-alcoholic solution to a lower temperature, thereby causing precipitation of the ergosterol and cerebrin from the solution, the fatty acid salts remaining in solution due to the solubility of the same therein at the lower temperature, and recovering the thus precipitated ergosterol and cerebrin.

The temperature to which the boiling aqueous-alcoholic solution is cooled after saponification of the lipids contained therein is generally about room temperature i. e. about 20–30° C., it having been found according to the present invention that the ergosterol and cerebrin precipitate from the solution at room temperature in easily filterable form when the ergosterol, cerebrin and lipids are extracted from the raw material by a solvent and then saponified in a boiling aqueous-alcoholic solution.

Any raw material containing ergosterol and cerebrin, such raw material always also containing lipids, may be subjected to the process of the present invention. Yeast, such as culture yeast, pressed yeast, baking yeast, as well as wild yeast such as torula utilus are suitable raw materials for the process of the present invention. Other raw materials containing ergosterol are ergot, moulds, etc.

Any solvent for the ergosterol and cerebrin, in which solvent most lipids will generally be soluble may be utilized for extracting the ergosterol, cerebrin and lipids from the raw material. In general it may be stated that any fat solvent may be used. The most suitable solvents are hydrocarbons such as benzine and benzene, chlorinated hydrocarbons such as chloroform, carbon tetrachloride, methylene chloride and trichlorethylene, ketones, such as acetone, ether such as ethyl ether, ester such as ethyl acetate and methyl acetate, and alcohols such as methanol, ethanol, propanol and isopropanol. Methanol is most highly preferred according to the present invention for the extracting solvent and is also most highly preferred as the alcohol of the aqueous-alcoholic medium in which the saponification of the lipids is accomplished. Also other low molecular weight alcohols such as ethanol, however, are suitable for the aqueous-alcoholic medium for the saponification of the lipids.

Therefore according to the preferred embodiments of the present invention, the ergosterol, cerebrin and lipids are extracted from the raw material by means of methanol and a heated aqueous-methanol solution is formed from the methanol extract, in which solution the saponification of the lipids is carried out by heating and refluxing. Upon cooling the solution to room temperature the ergosterol and cerebrin immediately precipitate an easily filterable form.

Upon cooling of the aqueous-alcoholic solution after saponification, the formed fatty acid salts remain dissolved in the solution whereas the ergosterol and cerebrin precipitate therefrom. The free fatty acids may be recovered after separation of the ergosterol and cerebrin from the remaining solution by acidification of the solution. The solvent, namely the alcohol, may then be recovered from the solution i. e. by distillation and further utilized.

A further embodiment of the present invention comprises the separation of the ergosterol from the cerebrin, these two substances having precipitated from the cooled aqueous-alcoholic solution. This embodiment not only separates the ergosterol and cerebrin from each other but also separates these substances from any impurities, particularly carbohydrates which may have precipitated from the aqueous-alcholic solution and been mixed with the raw ergosterol precipitate. According to this embodiment the precipitate, after separation from the aqueous-alcoholic solution, is treated with a heated selective solvent, namely acetone, ether or chloroform. This causes dissolution of the ergosterol and cerebrin in the solvent while the impurities such as the carbohydrates remain undissolved. The cooling of the solution to room temperature causes precipitation of the cerebrin which may then be separated from the remaining solution by filtration or any other method.

The ergosterol and cerebrin are both soluble in heated acetone, ether and chloroform. At room temperature, however, the cerebrin is only slightly soluble in the solvent compared with ergosterin. So it is possible to immediately dissolve ergosterol and cerebrin at room temperature in an amount of the solvent, which is sufficient for dissolution of the ergosterol but is insufficient for dissolution of cerebrin. It is preferred to carry out the dissolution by heating and to precipitate the cerebrin by cooling. Hereby it is possible to immediately choose the correct amount of the solvent. To accelerate the dissolution it is also possible to use a larger amount of the solvent and to concentrate the same before, during or after cooling to a volume which is sufficient for dissolution of the ergosterol at room temperature but insufficient for dissolution of the cerebrin. It is preferred, however, to carry out the dissolution at a temperature as high as possible, i. e. at the boiling point or close to it. In this case it is preferred to employ a smaller amount of solvent than is necessary for dissolution of the ergosterol at room temperature and to bring the solution to the exact volume after the dissolution by addition of more solvent before or during cooling. The cooling to room temperature causes the precipitation of the cerebrin from the solution. It is also possible to immediately dissolve the cerebrin and ergosterol in an amount of heated solvent which is sufficient for dissolution of both substances when heated but which, when cooled, is only sufficient for dissolution of the ergosterol therein, thereby causing precipitation of the cerebrin. At a temperature of 20–30° C. the precipitation of the cerebrin from the acetone, ether or chloroform solution of the cerebrin and ergosterol is complete.

The aqueous-alcoholic solution remaining after precipitation of the ergosterol and cerebrin therefrom by cooling of the solution may be further treated as follows: The solution is acidified causing formation of the free fatty acids from the fatty acid salts and the alcohol is recovered from the solution by distillation. The distilling-off of the alcohol causes separation of the fatty acids as a thick oily layer on the alcohol-free solution. The fatty acids may be quantitatively recovered i. e. through decantation from this oily layer.

The extract obtained from treating the starting material, i. e. yeast, containing lipids, ergosterol and cerebrin by means of a solvent, preferably an alcohol and most preferably methanol, is dissolved in a heated aqueous-alcoholic solvent. The alcohol utilized in the aqueous-alcoholic solvent is most preferably methanol and the concentration thereof is preferably between 60–90%. If the original solvent used to treat the raw material is an alcohol i. e. methanol, it is merely necessary to add water to the extract in an amount of 10–40% and heat so as to form the heated aqueous-methanol solution containing 60–90% methanol. The formed heated aqueous-methanol solution is then treated with an alkali in order to saponify the lipids contained therein.

It has been found that the higher the water concentration of the aqueous-methanol solution, the more pure the ergosterol because at higher methanol concentrations the impurities, particularly the alkali salts of the fatty acids, are sparingly soluble and precipitate along with the ergosterol and cerebrin. On the other hand, at too high a water content the ergosterol is slimy and therefore very difficult to filter and simultaneously the ergosterol yield is reduced. It is to be noted that the water can be added to form the aqueous-alcoholic solution at the desired concentration, in the form of an aqueous solution of the alkali hydroxide utilized for the saponification.

A further factor which controls the yield and purity of the raw ergosterol is the total amount of the aqueous-alcoholic, particularly aqueous-methanol mixture. If this amount is too low the concentration of the raw ergosterol is very low, and if the amount is too high the ergosterol yield is very small.

It has furthermore been noted that the different proportionate solubilities of sodium and potassium soaps is of importance. It has been noted that by saponifying with sodium hydroxide relatively more methanol is required for a definite amount of lipid treated than by saponification with potassium hydroxide, in order that the resulting soaps should remain in solution.

With this consideration in view it has been determined that the amount and concentration of methanol to be utilized when potassium hydroxide is used for the saponification of the lipids should be 3–6 liters of aqueous-methanol having a concentration of 60–90%, and preferably 75–90% methanol for each kg. of raw lipid (that is the amount of dry substance in the extract i. e. the methanol extract). Utilizing sodium hydroxide as saponification agent, the amount of aqueous-methanol should be 4–12 liters, containing 60–90% and preferably 75–90% methanol per each kg. of dry lipid. The most favorable amount and concentration of the methanol may be easily determined for each raw lipid by simple pre-testing.

It has been found that the present invention is particularly advantageous when applied to yeast as the raw material in that the extracted yeast, in contrast to the prior known processes, retains its biological composition and may be further utilized in various manners i. e. as albumin-rich foodstuff, as starting material for the production of albumins, for the extraction of nucleic acids and the like therefrom, etc.

The most preferred process according to the present invention comprises the treatment of the yeast with hot methanol to extract the cerebrin, ergosterol and lipids therefrom and filtration of the solution. The remaining yeast is then washed with methanol and the wash methanol may be further utilized as extracting agent for fresh yeast. By the addition of the desired amount of an aqueous solution of an alkali, the methanol content of the extract is brought to between 60–90% and after heating and refluxing for about one-half hour in order to saponify the lipids, the solution is cooled to room temperature causing precipitation of the ergosterol and cerebrin, which then are filtered off.

The precipitated ergosterol and cerebrin may then be extracted by means of a heated selective solvent such as aceton, ether or chloroform. The selective solvent solution is then filtered to remove any undissolved impurities therefrom and cooled to a temperature of about 20–30° C. at which temperature all the ergosterol remains dissolved, the solution preferably having been brought to the exact volume by evaporation of some of the solvent or by addition of same respectively, and the cerebrin precipitates therefrom. The ergosterol may be recovered from the cooled solution in extremely pure form. The aqueous-methanol solution may be treated as previously described so as to obtain the free fatty acids and the methanol therefrom.

The following examples are given as illustrative of preferred embodiments of the present invention, the scope of said invention not however being limited thereto.

*Example 1*

108 kg. of air-dried yeast (containing 98% dry yeast) having a content of 400 g. ergosterol is finely milled and treated with about 10 times its amount, that is with about 1000 liters of 97.5% methanol heated to the boiling point thereof and stirred at this temperature for about one-half hour.

The methanol extract is filtered at about 65° C. and the yeast residue washed with an equal amount of boiling methanol. The washing methanol may be used for the extraction of fresh yeast. The methanol extract which contains about 20% of the original dry yeast and about 385 g. ergosterol is evaporated to a total volume of about 160 liters and, after the addition of 7.2 kg. of 50% aqueous sodium hydroxide solution is heated and refluxed for about one-half hour. After cooling to room temperature the precipitated raw ergosterol is filtered from the remaining cooled solution and is found to weigh about 1165 g. and contain about 350 g. pure ergosterol.

The raw ergosterol is extracted with 49 liters of hot acetone. The hot acetone solution is then cooled to 20° C. causing precipitation of the cerebrin which is filtered from the remaining solution and found to weigh about 60 g. after drying. The precipitated cerebrin which still contains 4 g. ergosterol may be further treated with acetone to remove the remaining ergosterol therefrom. The acetone filtrate upon re-crystallization in the usual manner yields 98–100% pure ergosterol.

The mother liquor of the methanol soap solution is acidified to pH 5 and the methanol removed from the solution by distillation. About 3 kg. of fatty acids separate from the methanol-free acidified soap solution as an oily layer which may be easily separated from the water and recovered.

Example 2

A methanol extract is formed from 108 kg. of air dried yeast as described in Example 1. The methanol extract is evaporated to a volume of about 110 liters, mixed with 10 kg. 50% aqueous potassium hydroxide solution and heated and refluxed to saponify the lipids. The further treatment is as described in Example 1.

Example 3

10 kg. of yeast methanol extract (100% dry substance) which contains 2.25% (equal to 225 g.) ergosterol is treated with 70 liters of 87% methanol and 3.6 kg. 50% aqueous sodium hydroxide solution and heated and refluxed for one-half hour until saponification is complete. After cooling to room temperature the raw ergosterol which after drying weighs 740 g. and contains 213 g. pure ergosterol, is filtered. The further treatment is as described in Example 1.

Example 4

5 g. pure lipid (100% dry) which contains 6% (equal to 380 g.) ergosterol is treated with 100 liters of 85% methanol 2 kg. 50% aqueous sodium hydroxide and heated and refluxed for one-half hour. After cooling the raw ergosterol is filtered and dried and found to weigh 780 g. and to contain 340 g. pure ergosterol. The further treatment is as in Example 1.

Example 5

2 kg. acetone-soluble lipids from yeast, containing 12.5% (equal to 250 g.) ergosterol is treated with 60 liters of 82% methanol and 800 g. of 50% aqueous sodium hydroxide and heated and refluxed for one-half hour. Upon cooling the resulting precipitate of raw ergosterol weighs 440 g. and consists about 50% of pure ergosterol. The pure ergosterol is obtained by further treatment as described in Example 1.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalance of the following claims.

What is claimed as new and desired to be secured by Letters Patent is:

1. A process of obtaining ergosterol from lipid-containing raw materials containing the same, comprising the steps of extracting said ergosterol along with at least a portion of said lipids from said raw materials by contact thereof with at least one lower alcohol as solvent therefor for a time sufficient to form an extract thereof; treating the thus formed extract in a boiling aqueous-alcoholic solution of said extracted ergosterol and lipids with alkali for a time sufficient to saponify said lipids, thereby forming in said boiling aqueous-alcoholic solution fatty acid salts; cooling said aqueous-alcoholic solution to a sufficiently low temperature to precipitate said ergosterol from said solution, said temperature being sufficiently high to cause said fatty acid salts to remain in solution due to the solubility of the same therein at temperatures at which said ergosterol is no longer soluble; and recovering said thus precipitated ergosterol, whereby said ergosterol may be recovered from said lipid-containing raw material in a relatively short treatment time and in relatively high yield.

2. A process of obtaining ergosterol from lipid-containing raw materials containing the same, comprising the steps of extracting said ergosterol along with at least a portion of said lipids from said raw materials by contact thereof with at least one lower alcohol as solvent therefor for a time sufficient to form an extract thereof; treating the thus formed extract in a boiling aqueous-alcoholic solution of said extracted ergosterol and lipids with alkali for a time sufficient to saponify said lipids, thereby forming in said boiling aqueous-alcoholic solution fatty acid salts; cooling said aqueous-alcoholic solution to approximately room temperature, thereby causing precipitation of said ergosterol from said solution, said fatty acid salts remaining in solution due to the solubility of the same therein at room temperature; and recovering said thus precipitated ergosterol, whereby said ergosterol may be recovered from said lipid-containing raw material in a relatively short treatment time and in relatively high yield.

3. A process of obtaining ergosterol from lipid-containing raw materials containing the same, comprising the steps of extracting said ergosterol along with at least a portion of said lipids from said raw materials by contact thereof with methanol as solvent therefor for a time sufficient to form an extract thereof; treating the thus formed extract in a boiling aqueous-methanol solution of said extracted ergosterol and lipids with alkali for a time sufficient to saponify said lipids, thereby forming in said boiling aqueous-methanol solution fatty acid salts; cooling said aqueous-methanol solution to approximately room temperature, thereby causing precipitation of said ergosterol from said solution, said fatty acid salts remaining in solution due to the solubility of the same therein at room temperature; and recovering said thus precipitated ergosterol, whereby said ergosterol may be recovered from said lipid-containing raw material in a relatively short treatment time and in relatively high yield.

4. A process of obtaining ergosterol from lipid-containing raw materials containing the same, comprising the steps of extracting said ergosterol along with at least a portion of said lipids from said raw materials by contact thereof with at least one lower alcohol as solvent therefor for a time sufficient to form an extract thereof; treating the thus formed extract in a boiling aqueous-alcoholic solution of said extracted ergosterol and lipids with sodium hydroxide for a time sufficient to saponify said lipids, thereby forming in said boiling aqueous-alcoholic solution fatty acid salts; cooling said aqueous-alcoholic solution to a sufficiently low temperature to precipitate said ergosterol from said solution, said temperature being sufficiently high to cause said fatty acid salts to remain in solution due to the solubility of the same therein at temperatures at which said ergosterol is no longer soluble; and recovering said thus precipitated ergosterol, whereby said ergosterol may be recovered from said lipid-containing raw material in a relatively short treatment time and in relatively high yield.

5. A process of obtaining ergosterol from lipid-containing raw materials containing the same, comprising the steps of extracting said ergosterol along with at least a portion of said lipids from said raw materials by contact thereof with at least one lower alcohol as solvent therefor for a time sufficient to form an extract thereof; treating the thus formed extract in a boiling aqueous-alcoholic solution of said extracted ergosterol and lipids with potassium hydroxide for a time sufficient to saponify said lipids, thereby forming in said boiling aqueous-alcoholic solution fatty acid salts; coling said aqueous-alcoholic solution to a sufficiently low temperature to precipitate said ergosterol from said solution, said temperature being sufficiently high to cause said fatty acid salts to remain in solution due to the solubility of the same therein at temperatures at which said ergosterol is no longer soluble; and recovering said thus precipitated ergosterol, whereby said ergosterol may be recovered from said lipid-containing raw material in a relatively short treatment time and in relatively high yield.

6. A process of obtaining ergosterol from lipid-containing raw materials containing the same, comprising the steps of extracting said ergosterol along with at least a portion of said lipids from said raw materials by contact thereof with at least one lower alcohol as solvent therefor for a time sufficient to form an extract thereof; treating the thus formed extract in a boiling aqueous-methanol solution containing 60–90% methanol of said extracted ergosterol and lipids with alkali for a time sufficient to saponify said lipids, thereby forming in said boiling aqueous-methanol solution fatty acid salts; cooling said aqueous-methanol solution to approximately room temperature, thereby causing precipitation of said ergosterol from said solution, said fatty acid salts remaining in solution due to the solubility of the same therein at room temperature; and recovering said thus precipitated ergosterol, whereby said ergosterol may be recovered from said lipid-containing raw material in a relatively short treatment time and in relatively high yield.

7. A process of obtaining ergosterol from lipid-containing raw materials containing the same, comprising the steps of extracting said ergosterol along with at least a portion of said lipids from said raw materials by contact thereof with methanol as solvent therefor for a time sufficient to form an extract thereof; forming a boiling aqueous-methanol solution of said extracted ergosterol and lipids containing 4–12 liters aqueous-methanol per kg. of lipid in said extract and having a methanol concentration of 60–90% and treating the thus formed boiling aqueous-methanol solution with sodium hydroxide for a time sufficient to saponify said lipids, thereby forming in said boiling aqueous-methanol solution fatty acid salts; cooling said aqueous-methanol solution to approximately room temperature, thereby causing precipitation of said ergosterol from said solution, said fatty acid salts remaining in solution due to the solubility of the same therein at room temperature; and recovering said thus precipitated ergosterol, whereby said ergosterol may be recovered from said lipid-containing raw material in a relatively short treatment time and in relatively high yield.

8. A process of obtaining ergosterol from lipid-containing raw materials containing the same and also containing cerebrin, comprising the steps of extracting said ergosterol and cerebrin along with at least a portion of said lipids from said raw materials by contact thereof with at least one lower alcohol as solvent therefor for a time sufficient to form an extract thereof; treating the thus formed extract in a boiling aqueous-alcoholic solution of said extracted ergosterol, cerebrin and lipids with a alkali for a time sufficient to saponify said lipids, thereby forming in said boiling aqueous-alcoholic solution fatty acid salts; cooling said aqueous-alcoholic solution to a sufficiently low temperature, thereby to precipitate said ergosterol and cerebrin from said solution, said temperature being sufficiently high to cause said fatty acid salts to remain in solution due to the solubility of the same therein at temperatures at which said ergosterol is no longer soluble; separating said thus precipitated ergosterol and cerebrin from the remaining solution; dissolving the thus separated ergosterol and cerebrin in at least one heated selective solvent selected from the group consisting of acetone, ether and chloroform so as to form a heated solution of said ergosterol and said cerebrin free of any impurities mixed with said precipitated ergosterol and cerebrin from said cooled aqueous-alcoholic solution and insoluble in said selective solvent; cooling said heated solution to approximately room temperature, thereby causing precipitation of said cerebrin from said solution; and recovering from said thus obtained cerebrin-free solution substantially pure ergosterol, whereby said ergosterol may be recovered from said lipid containing raw material in a relatively short treatment time and in relatively high yield.

9. A process of obtaining ergosterol from lipid-containing raw materials containing the same and also containing cerebrin, comprising the steps of extracting said ergosterol and cerebrin along with at least a portion of said lipids from said raw materials by contact thereof with at least one lower alcohol as solvent therefor for a time sufficient to form an extract thereof; treating the thus formed extract in a boiling aqueous-alcoholic solution of said extracted ergosterol, cerebrin and lipids with alkali for a time sufficient to saponify said lipids, thereby forming in said boiling aqueous-alcoholic solution fatty acid salts; cooling said aqueous-alcoholic solution to a sufficiently low temperature to precipitate said ergosterol and cerebrin from said solution, said temperature being sufficiently high to cause said fatty acid salts to remain in solution due to the solubility of the same therein at temperatures at which said ergosterol is no longer soluble; separating said thus precipitated ergosterol and cerebrin from the remaining solution; dissolving the thus separated ergosterol and cerebrin in an amount of least one heated selective solvent selected from the group consisting of acetone, ether and chloroform sufficient to dissolve therein in heated state said ergosterol and cerebrin and at room temperature said ergosterol only so as to form a heated solution of said ergosterol and said cerebrin free of any impurities mixed with said precipitated ergosterol and cerebrin from said cooled aqueous-alcoholic solution and insoluble in said selective solvent; cooling said heated solution to approximately room temperature, thereby causing precipitation of said cerebrin from said solution; and recovering from said thus obtained cerebrin-free solution substantially pure ergosterol, whereby said ergosterol may be recovered from said lipid-containing raw material in a relatively short treatment time and in relatively high yield.

10. A process of obtaining ergosterol from lipid-containing raw materials containing the same and also containing cerebrin, comprising the steps of extracting said ergosterol and cerebrin along with at least a portion of said lipids from said raw materials by contact thereof with methanol as solvent therefor for a time sufficient to form an extract thereof; forming a boiling aqueous-methanol solution of said extracted ergosterol, cerebrin and lipids containing 4–12 liters aqueous-methanol per kg. of lipid in said extract and having a methanol concentration of 60–90% and treating the thus formed boiling aqueous-methanol solution with sodium hydroxide for a time sufficient to saponify said lipids, thereby forming in said boiling aqueous-methanol solution fatty acid salts; cooling said aqueous-methanol solution to approximately room temperature, thereby causing precipitation of said ergosterol and cerebrin from said solution, said fatty acid salts remaining in solution due to the solubility of the same therein at room temperature; separating said thus precipitated ergosterol and cerebrin from the remaining solution; dissolving the thus separated ergosterol and cerebrin in at least one heated selective solvent selected from the group consisting of acetone, ether and chloroform so as to form a heated solution of said ergosterol and said cerebrin free of any impurities mixed with said precipitated ergosterol and cerebrin from said cooled aqueous-methanol solution and insoluble in said selective solvent; cooling said heated solution to approximately room temperature, thereby causing precipitation of said cerebrin from said solution; and recovering from said thus obtained cerebrin-free solution substantially pure ergosterol, whereby said ergosterol may be recovered from said lipid-containing raw material in a relatively short treatment time and in relatively high yield.

11. A process of obtaining ergosterol from lipid-containing raw materials containing the same, comprising the steps of extracting said ergosterol along with at least a portion of said lipids from said raw materials contact thereof with methanol as solvent therefor for a time sufficient to form an extract thereof; treating the thus formed extract in a boiling aqueous-methanol solution of said extracted ergosterol and lipids with alkali for a time sufficient to saponify said lipids, thereby forming in said boiling aqueous-methanol solution fatty acid salts; cooling said aqueous-methanol solution to approximately room temperature, thereby causing precipitation of said ergosterol from said solution, said fatty acid salts remaining in solution due to the solubility of the same therein at room temperature; recovering said thus precipitated ergosterol by said ergosterol may be recovered from said lipid-containing raw material in a relatively short treatment time and in relatively high yield; acidifying the thus remaining aqueous-methanol solution so as to form fatty acids from said fatty acid salts; and recovering said methanol and said free fatty acids from the thus acidified solution.

12. A process of obtaining ergosterol from microorganisms containing the same and also containing lipids, comprising the steps of extracting said ergosterol along with at least a portion of said lipids from said raw materials by contact thereof with at least one lower alcohol as solvent therefor for a time sufficient to form an extract thereof; treating the thus formed extract in a boiling aqueous-alcoholic solution of said extracted ergosterol and lipids with alkali for a time sufficient to saponify said lipids, thereby forming in said boiling aqueous-alcoholic solution fatty acid salts; cooling said aqueous-alcoholic solution to approximately room temperature, thereby causing precipitation of said ergosterol from said solution, said fatty acid salts remaining in solution due to the solubility of the same therein at room temperature; and recovering said thus precipitated ergosterol, whereby said ergosterol may be recovered from said lipid-containing raw material in a relatively short treatment time and in relatively high yield.

References Cited in the file of this patent

UNITED STATES PATENTS

| | | |
|---|---|---|
| 1,167,230 | Tambach | Jan. 4, 1916 |
| 1,724,706 | Griessbach | Aug. 13, 1929 |
| 1,842,929 | Bills | Jan. 26, 1932 |
| 1,912,440 | Frey | June 6, 1933 |
| 2,355,661 | Light | Aug. 15, 1944 |
| 2,552,896 | Lee et al. | May 15, 1951 |
| 2,585,954 | Mattikow et al. | Feb. 19, 1952 |
| 2,637,726 | Sifferd | May 5, 1953 |

OTHER REFERENCES

Reindel: Annalen der Chemie, 1930, vol. 480, pp. 76–92.

Bohonos: J. Biochem, vol. 149 (1943), pp. 295–300.

Foster: Chem. Activities of Fungi, p. 136 (1949).

Societe de chemie Biologique 19, 1937, pp. 1164–68.

Witcoff: "The Phosphatides," Reinhold Publ. Co., 1951, p. 46.